United States Patent
Hutchens

(10) Patent No.: US 9,296,441 B2
(45) Date of Patent: Mar. 29, 2016

(54) HANDS-FREE SIGNALING SYSTEMS AND RELATED METHODS

(71) Applicant: Michael P. Hutchens, Portland, OR (US)

(72) Inventor: Michael P. Hutchens, Portland, OR (US)

(*) Notice: Subject to any disclaimer, the term of this patent is extended or adjusted under 35 U.S.C. 154(b) by 166 days.

(21) Appl. No.: 14/066,024

(22) Filed: Oct. 29, 2013

(65) Prior Publication Data

US 2014/0118129 A1 May 1, 2014

Related U.S. Application Data

(60) Provisional application No. 61/719,649, filed on Oct. 29, 2012.

(51) Int. Cl.
*B62J 3/00* (2006.01)
*B62J 6/00* (2006.01)
*B62J 99/00* (2009.01)

(52) U.S. Cl.
CPC *B62J 6/001* (2013.01); *B62J 6/003* (2013.01); *B62J 6/005* (2013.01); *B62J 2006/006* (2013.01); *B62J 2099/002* (2013.01); *B62J 2099/0013* (2013.01)

(58) Field of Classification Search
CPC ............ B62J 6/001; B62J 6/003; B62J 6/005; B62J 2099/002; B62J 2099/0013; B62J 2006/006
USPC .............. 340/432, 321, 465, 463, 468, 686.1, 340/686.6, 475, 476; 362/473, 476
See application file for complete search history.

(56) References Cited

U.S. PATENT DOCUMENTS

| 3,876,976 | A | 4/1975 | Cross, Jr. |
| 4,363,022 | A | 12/1982 | Manacci |
| 4,559,516 | A | 12/1985 | Schott |
| 4,891,736 | A | 1/1990 | Gouda |
| 5,872,510 | A | 2/1999 | O'Shaughnessy |
| 6,992,572 | B1* | 1/2006 | Lovegrove .................... 340/432 |
| 8,075,168 | B1 | 12/2011 | Shoolman |
| 8,388,164 | B2 | 3/2013 | Waters |

(Continued)

FOREIGN PATENT DOCUMENTS

| DE | 202004014675 U1 | 12/2004 |
| WO | 9921477 A1 | 5/1999 |

(Continued)

OTHER PUBLICATIONS

8-Bit AVR Microcontroller With 1K Bytes In-System Programmable Flash, ATMEL ©, ATtiny13, ATtiny13V, Summary, Rev. 2535JS-AVR-08/10, ATMEL Corporation, 22 pages.

(Continued)

*Primary Examiner* — Anh V La
(74) *Attorney, Agent, or Firm* — Ganz Pollard, LLC

(57) ABSTRACT

A hands-free signaler can include a gesture-detection sensor configured to detect a change in state associated with movement of a portion of a user's body other than one or both of his hands. A controller can be configured to assess whether a change in state detected by the gesture-detection sensor resulted from an intentional or an unintentional gesture by the user. The signaler can have an illuminable indicator. The controller can be further configured to selectively activate the illuminable indicator in a manner corresponding to a detected change of state assessed by the controller to have resulted from a respective intentional gesture.

15 Claims, 13 Drawing Sheets

(56) References Cited

U.S. PATENT DOCUMENTS

| | | |
|---|---|---|
| 8,466,794 B2 | 6/2013 | Mack |
| 8,491,145 B2 | 7/2013 | Waters |
| 2005/0046576 A1* | 3/2005 | Julian et al. ............... 340/573.1 |
| 2007/0247296 A1* | 10/2007 | Moore et al. ................ 340/467 |
| 2008/0266838 A1 | 10/2008 | Lin |
| 2009/0268478 A1* | 10/2009 | James ......................... 362/473 |
| 2011/0057781 A1* | 3/2011 | Lee ............................. 340/432 |
| 2011/0115614 A1 | 5/2011 | Huang |
| 2012/0069552 A1 | 3/2012 | Richter |
| 2013/0033370 A1 | 2/2013 | Langlois |
| 2013/0201664 A1 | 8/2013 | Harooni |

FOREIGN PATENT DOCUMENTS

| | | |
|---|---|---|
| WO | 03001555 A1 | 1/2003 |
| WO | 2005052718 A2 | 6/2005 |
| WO | 2010076985 A2 | 7/2010 |
| WO | 2012074927 A2 | 6/2012 |
| WO | 2012100053 A1 | 7/2012 |

OTHER PUBLICATIONS

Analog Devices—Low Cost, Low Cost±2 g/±10 g Dual Axis iMEMS® Accelerometers With Digital Output, © Analog Devices, Inc., 1999, 11 pages.

"YouTurn DIY: Part 1" uploaded by Jack O'Neal II on Oct. 14, 2011; YouTube [Online] Retrieved from the <URL: http://www.youtube.com/watch?v=0x5E2I25B-Y&feature=youtu.be>; visted Oct. 29, 2013 (Screen shot of 1page).

"Portlander Looks to Kickstarter to Fund Bike Turn Signal Idea", [Online] Retrieved from the <URL: http://bikeportland.org/2011/07/29/portlander-looks-to-kickstarter-to-fund-bike-turn-signal-idea-57047>, BikePortland.org, (screen shot of 21 pages).

\* cited by examiner

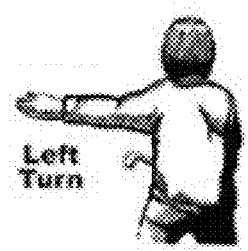
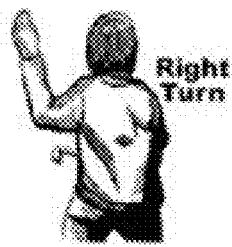
FIG. 1A  FIG. 1B
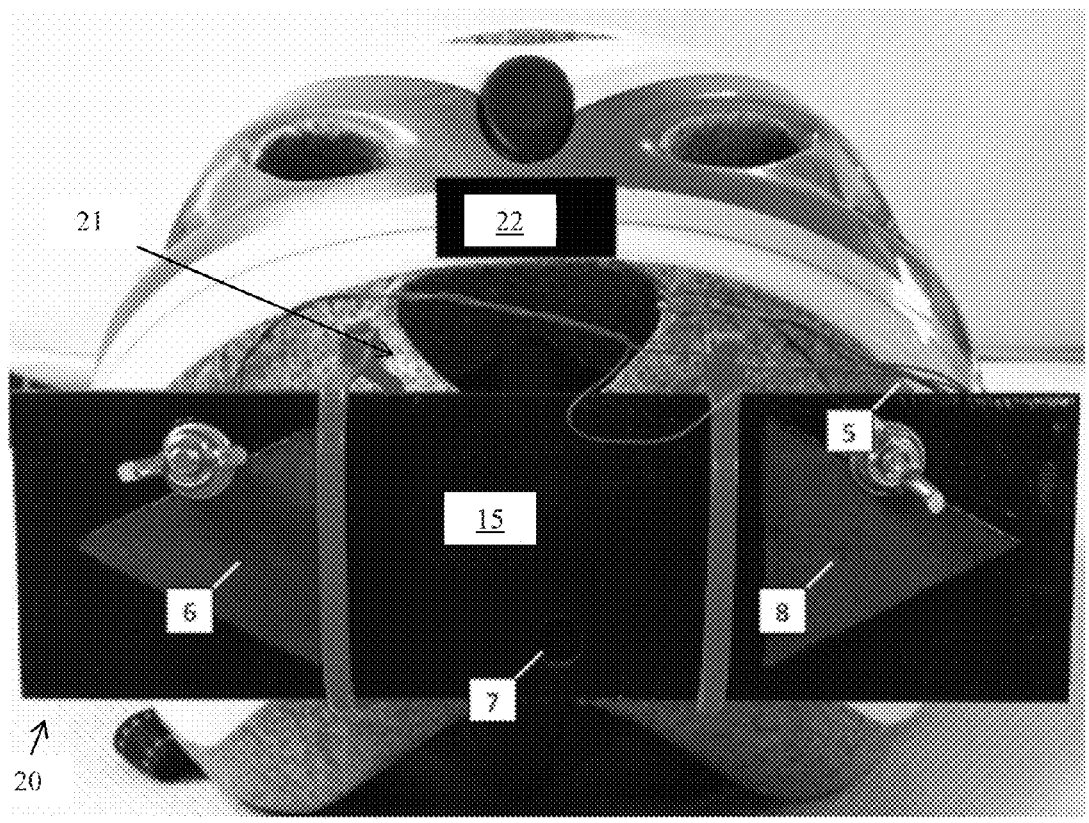
FIG. 2

US 9,296,441 B2

HANDS-FREE SIGNALING SYSTEMS AND RELATED METHODS

RELATED APPLICATIONS

This application claims benefit of and priority from U.S. Provisional Application Ser. No. 61/719,649, filed Oct. 29, 2012, the contents of which are hereby incorporated by reference as if recited in full herein, for all purposes.

BACKGROUND

This application, and the innovations and related subject matter disclosed herein, (collectively referred to as the "disclosure") generally concern hands-free signaling systems and related methods, and more particularly, but not exclusively, to signaling systems and related methods for bicyclists, with a helmet-mounted, gesture-operated signaler being but one example of such hands-free signaling systems.

Traditionally, cyclists have signaled their intention to turn using hand gestures, as shown in FIGS. 1A and 1B. For example, a laterally extended, straight left arm (FIG. 1A) indicates the cyclist's intention to turn left, and a laterally extended, left arm bent at 90-degrees so the cyclist's left hand is raised (FIG. 1B) indicates the cyclist's intention to turn right. Such signals are thought to be unfamiliar to most motorists.

In low-light conditions, motorists and others have difficulty seeing such hand gestures. In an attempt at overcoming this deficiency, others have proposed mounting reflectors and/or lights to the rear of a cyclist's hand. One such proposal included a manually-operated switch to activate an intermittently illuminated (e.g., "flashing") light. Another proposal for a hand-mounted light included an accelerometer-actuated switch configured to activate an intermittently illuminated light when a user laterally extends his arm as shown in FIG. 1A or 1B.

Despite improving visibility of a cyclist's hand gestures in low-light conditions, such conventional signaling techniques for cyclists still require the cyclist to remove her hand from a handlebar to indicate an intention to turn. When a cyclist's hand is removed from the handlebar, the cyclist's ability to maneuver and control the bicycle is seriously diminished.

However, navigating a turn, particularly in the presence of motor or other traffic, requires the cyclist to maintain a high degree of control and maneuverability. Maintaining a high degree of control and maneuverability can be especially important for turning cyclists in urban areas rife with foot traffic, motor traffic, train tracks (or other embedded rails), and other obstacles the cyclist must navigate. Despite the need for cyclists to maintain a high degree of control and maneuverability, conventional turn-signaling techniques and devices require cyclists to lift a hand from the handlebar and to actually reduce the cyclist's degree of control of the bicycle while indicating an intention to turn.

And, unfortunately, some cyclists after crashing cannot communicate or otherwise indicate their presence to others. This can be particularly dangerous for a cyclist that has crashed in a low-light situation in the presence of motor traffic.

Thus, there remains a need for hands-free signaling systems configured to permit the cyclist to signal an intention to turn without having to remove his hand from the bicycle's handlebar. There also remains a need for systems and methods for translating a cyclist's intention into a form, or medium of communication, familiar to motorists. Moreover, there remains a need for associated methods of controlling or using such hands-free signaling systems. And, there remains a need for hands-free signaling systems configured to provide a high-degree of visibility to a cyclist to permit others (e.g., automobile drives) to see him in a low-light situation. Further, a need remains for a signaling system configured to automatically indicate a cyclist's presence following a crash.

SUMMARY

The innovations disclosed herein overcome many problems in the prior art and address one or more of the aforementioned or other needs. In some respects, innovations disclosed herein concern signaling systems configured for activation by a user without using his hands. In other respects, innovations disclosed herein concern methods for initiating a signal using a gesture other than a hand gesture. In still other respects, innovations disclosed herein concern methods for distinguishing between an intentional gesture to initiate a signal indicating a selected intention (e.g., an intention to turn) and an unintentional gesture. And, in still other respects, innovations disclosed herein concern methods for initiating a selected signal in response to an unintentional gesture, or impact, as might result from a bicycle crash.

The foregoing and other features and advantages will become more apparent from the following detailed description, which proceeds with reference to the accompanying drawings. The following is a description of various inventive lines under the inventive subject matter. The appended claims, as originally filed in this document, or as subsequently amended, are hereby incorporated into this Summary section as if written directly in.

BRIEF DESCRIPTION OF THE DRAWINGS

Unless specified otherwise, the accompanying drawings illustrate aspects of the innovative subject matter described herein. Referring to the drawings, wherein like numerals refer to like parts throughout the several views and this specification, several embodiments of presently disclosed principles are illustrated by way of example, and not by way of limitation, wherein:

FIG. 1A shows a conventional hand gesture by a cyclist to indicate an intention to turn left;

FIG. 1B shows a conventional hand gesture by a cyclist to indicate an intention to turn right;

FIG. 2 shows a photograph of a rear portion of a signaler as disclosed herein fixedly coupled to a bicycle helmet, as but one example of headgear to which the signaler can be fixedly coupled;

DETAILED DESCRIPTION

The following describes various innovative principles related to hands-free signaling systems and related methods by way of reference to specific examples of hands-free signaling systems and specific techniques for initiating a signal. Nonetheless, one or more of the disclosed principles can be incorporated in various other signaling systems to achieve any of a variety of corresponding system characteristics. Techniques and systems described in relation to particular configurations, applications, or uses, are merely examples of techniques and systems incorporating one or more of the innovative principles disclosed herein and are used to illustrate one or more innovative aspects of the disclosed principles.

Thus, systems and methods having attributes that are different from those specific examples discussed herein can embody one or more of the innovative principles, and can be used in applications not described herein in detail, for example, in "hands-free" automobile communication systems, aviation communication systems, conference room speaker phones, auditorium sound systems, etc. Accordingly, such alternative embodiments also fall within the scope of this disclosure.

Overview of Hands-Free Signaling Systems

Figure 4:
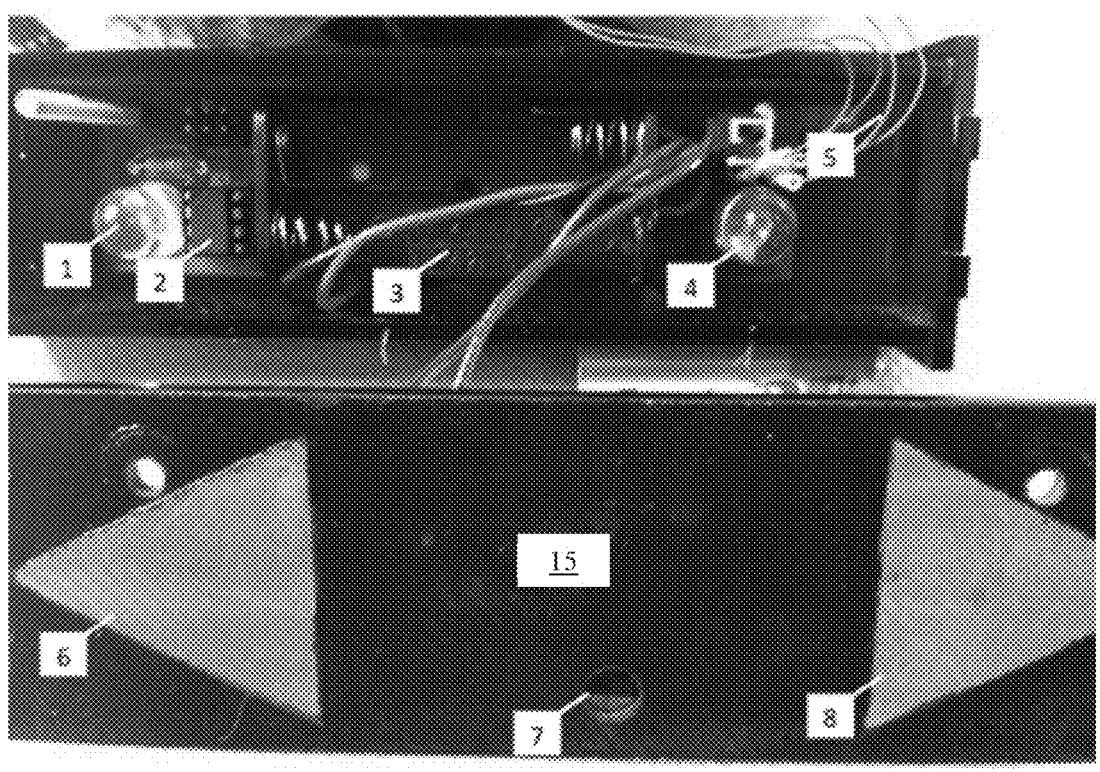
FIG. 4 shows a photograph of the signaler shown in FIGS. 2 and 3 partially disassembled to reveal, inter alia, an interior of the signaler's housing.
Figure 5:
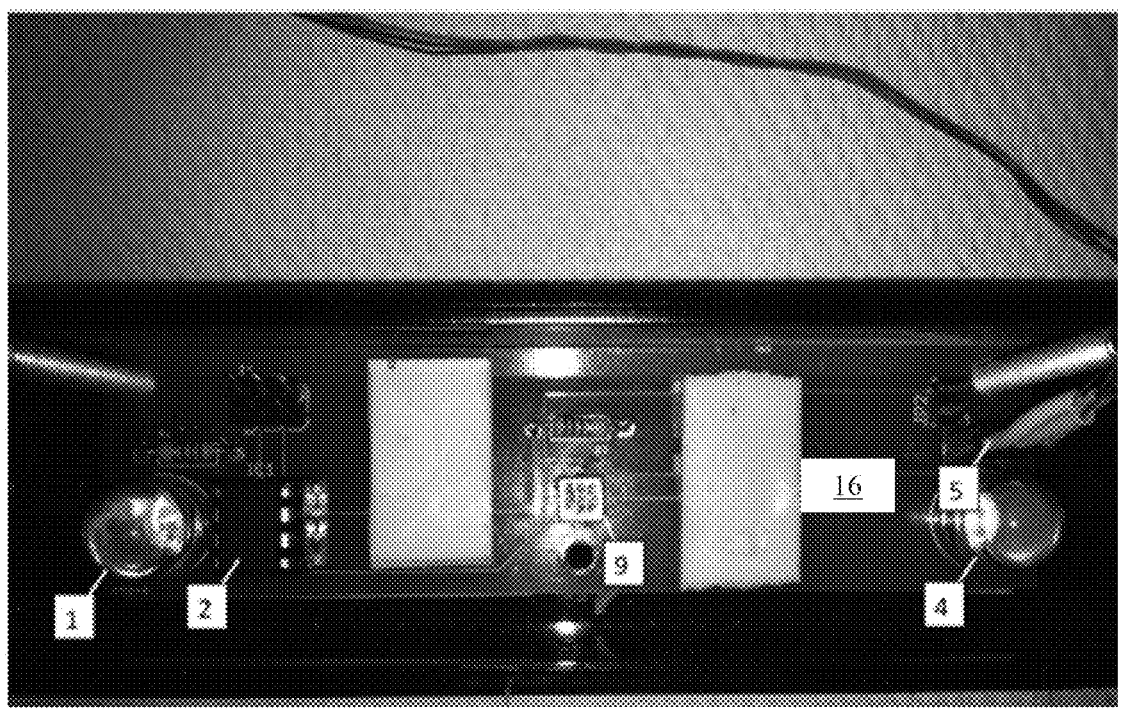
FIG. 5 shows a photograph of a printed circuit board and associated components of a signaler as shown in FIGS. 2 through 4.

A working embodiment of a hands-free signaling system is shown in FIG. 2. As shown, the working signaling system (or signaler) 20 can be mountably affixed to a rear-portion 21 of a conventional bicycle helmet 22. The signaler 20 has a left-turn indicator 6 and a right-turn indicator 8 (respectively illuminated by illumination components 1 and 4). Each of the left-turn indicator 6 and the right-turn indicator 8 are laterally spaced apart from each other and can be intermittently illuminated by a corresponding light-emitting diode (or LED) (FIG. 4). As shown, the left-turn indicator 6 has a triangular configuration with an apex of the triangle pointing to the left, and the right-turn indicator 8 has a triangular configuration with an apex of the triangle pointing to the right, such that the left- and the right-turn indicators are oriented in an opposed relationship relative to each other. In the example shown in FIG. 2, the respective LEDs are positioned within a housing 15 and operatively coupled to one or more components (e.g., an accelerometer and a controller) by way of a printed-circuit board 16 (or PCB), as shown in FIG. 5.

Operation of one or both of the turn indicators 6, 8 can be initiated by a user's intentional gesture. For example, a user can tilt his head toward his left shoulder to initiate operation of the left-turn indicator, or the user can tilt his head toward his right should to initiate operation of the right-turn signal. As but one of many possible alternative gestures and corresponding operations, a user can nod his head forward to initiate, for example, simultaneous operation of the left- and the right-turn indicators 6, 8. In general, disclosed signalers can be activated by imparting an acceleration along one or more sensitive axes of a sensor 9.

Disclosed signalers can include software, firmware, or an application-specific integrated circuit (ASIC) that, when executed, causes a signaler to carry out a method for distinguishing between an intentional and an unintentional gesture. When an unintentional acceleration having selected characteristics is detected, some signalers can activate an emergency illumination signal.

For example, in the event of a crash, operation of one or both of the turn indicators 6, 8 can be initiated by detection of a user's unintentional head motion. As but one possible example, if the signaler 20 experiences a selected (e.g., an impact-like) acceleration along one or more coordinate axes, the signaler can interpret the impulse as arising from a crash or accident, and cause the turn indicators 6, 8 to simultaneously flash an SOS signal using, for example, Morse code.

Some disclosed hands-free signaling systems include a sensor 9, a controller 2, and one or more illuminable indicators 1, 4, 10, 11. In general, the sensor 9 can be configured to detect one or more changes in state. One or more output channels of the sensor 9 can be operatively coupled to respective one or more inputs to the controller 2. And, the controller 2 and at least one of the indicators 1, 4, 10, 11 can be operatively coupled to each other such that the controller is configured to activate one or more of the at least one indicator in response to an input from one or more of the output channels of the sensor 9. As but one example, the controller 2 can activate one or more indicators 1, 4, 10, 11 in response to an input indicative of the sensor 9 detecting a selected degree of change in one or more states.

A hands-free signaling system as disclosed herein can be actuated when the user turns it on with a switch 7. A pair of light-emitting diodes 1 and 4 can blink in, for example, an alternating sequence following power-on, as to inform the user that the system is functioning properly. To signal an intended turn or lane change, a user can tilt his or her head left or right to activate a corresponding left- or right-indicator.

Left and right signal light-emitting diodes 1 and 4 can be electrically coupled to and controlled by the microcontroller 2. One or more batteries, contained in a battery container 3 defined by the housing 15, can provide power for components. The sensor 9, e.g., a 3-axis accelerometer, can be powered by the batteries and coupled to the microcontroller 2. An on/off switch 7 can close a circuit coupling other components to the batteries contained in the container 3. Wires 5 can connect two additional light emitting diodes 10, 11 mounted to a front region of the helmet 22 within a wearer's field of view. The housing 15 can include, for example, triangular lenses overlying the LEDs 1, 4 to form respective indicators 6, 8.

Figure 3:
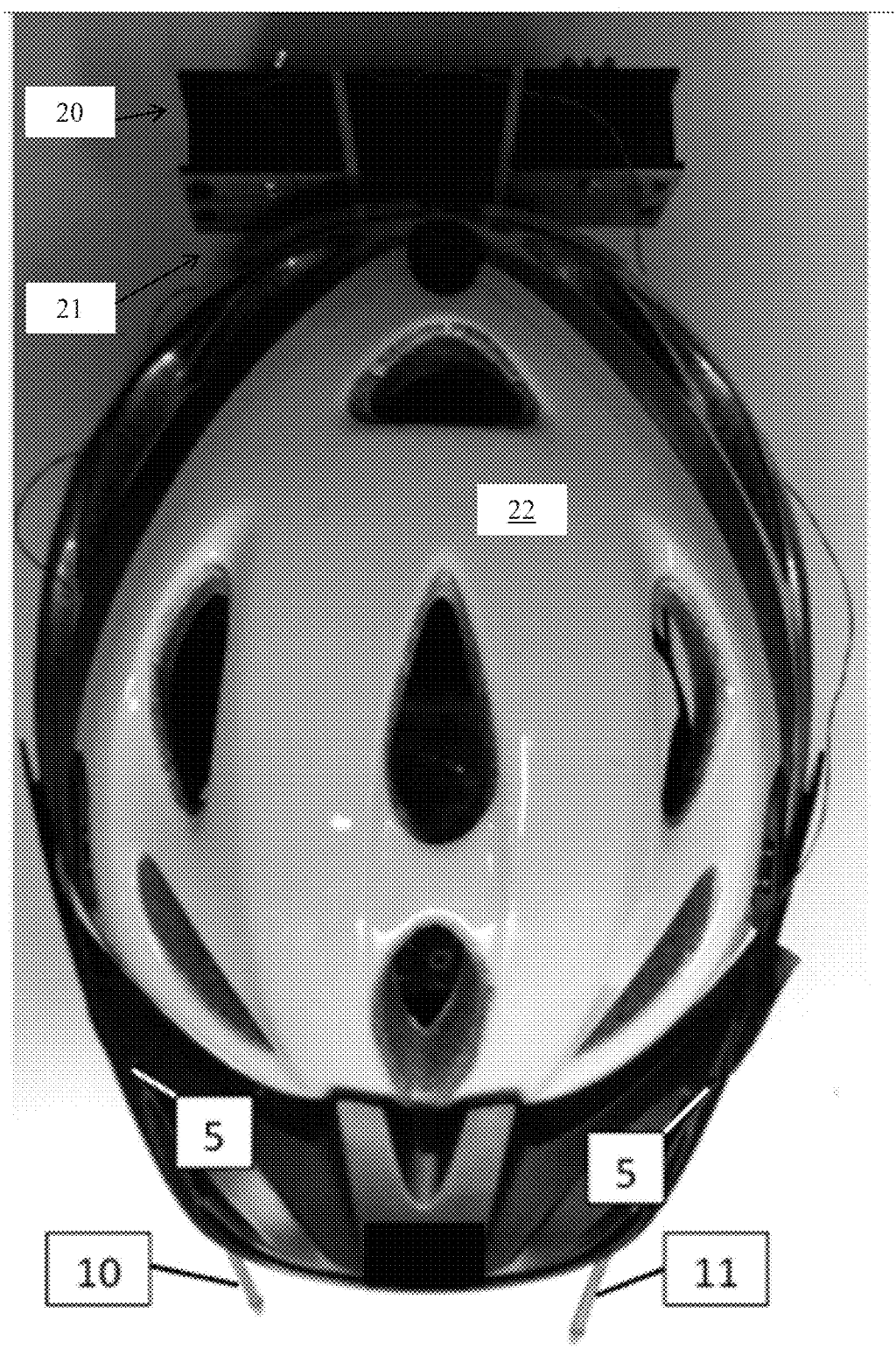
FIG. 3 shows a photograph of the signaler and headgear shown in FIG. 2, from above.

The housing 15 and the signaler 20 within can be securely attached to a rear-portion 21 of a user's helmet 22, as shown by way of example in FIGS. 2 and 3. If the signaler detects a tilt of a user's head (or other intentional gesture), e.g., by way of a 3-axis accelerometer (e.g., sensor 9), a microcontroller (or controller) 2 can receive information reflecting a magnitude and direction of acceleration detected by the 3-axis accelerometer 9. The controller can be configured to distinguish an intentional head-tilt from another type of movement (e.g., a movement not intended to signal a turn). The microcontroller 2 can activate a selected one or more of the indicators in a predefined manner corresponding to a user-intention (or, for example, an accident) inferred from characteristics of the user's head (or other) motion detected by the sensor 9. For example, the accelerometer can detect a user's head tiling to the right, and the controller can recognize such a gesture as an indication of the user's intention to turn right. Accordingly, the controller can cause a right indicator 4 (e.g., a light-emitting diode positioned on a right side of the system) to operate in a predefined manner suitable for signaling the user's intention to others, as by flashing a selected number of times, or for a selected duration of time. Some disclosed systems can include a secondary indicator 10, 11 configured to operate in a manner suitable for allowing a user to observe an operation of the system. For example, first and second LEDs (e.g., a left LED 11 and a right LED 10) can be positioned so as to be observable by a user and can operate in correspondence with a signal indicator 1, 4, as by blinking simultaneously with the signal indicators 1, 4. Connected by wires 5, front mounted light emitting diodes (right 10 or left 11) can also blink to signal proper operation to the user.

Disclosed signalers can be packaged as an integral portion of a helmet, or can be configured to mountable to a selected head-gear.

Gesture Detection Sensors

Some sensors 9 are configured to detect a change in state associated with a user's gesture. Such a sensor is generally referred to herein as a "gesture-detection sensor".

As a particular, but non-exclusive example, the sensor 9 can include (or be configured as) an accelerometer. Such an accelerometer can be configured to detect a linear acceleration applied to the accelerometer along one, two, or three coordinate axes (e.g., in a Cartesian coordinate system). Alternatively, such an accelerometer can be configured to detect an angular acceleration about one, two, or three coordinate axes, as by detecting a time-varying linear acceleration applied to the accelerometer along a plurality of Cartesian coordinate axes, as can occur along the Y- and the X-axes as a user tilts her head from a neutral, upright position to a tilted position.

Figure 8:
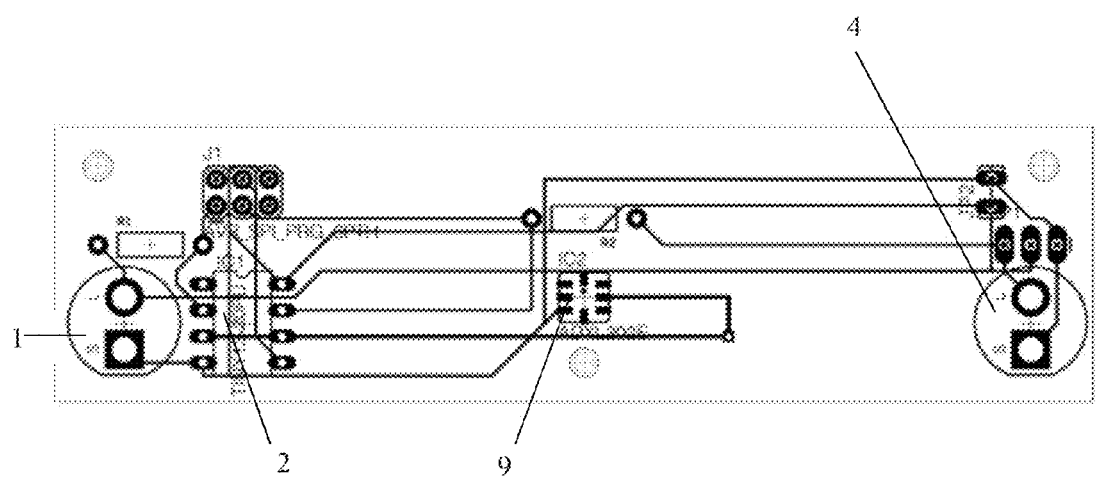
FIG. 8 shows an example wiring diagram for a printed circuit board of the type shown in FIG. 5.

As shown by way of example in FIG. 8, an accelerometer can be positioned within the signaler adjacent a generally centrally located position, relative to the overall signaler 20. Such a generally centrally located position can be a position on a printed circuit board 16 positioned adjacent a point of rotation of a user's body part (e.g., adjacent an origin of the coordinate system shown in FIG. 6A). By placing an accelerometer adjacent a point of rotation, accelerations arising from the quickness of a user's movement can be more easily distinguished from an acceleration arising from merely a change in orientation.

An accelerometer 9 can have an output channel corresponding to each axis along or about which acceleration can be sensed. Each respective output channel can emit a signal in correspondence with a degree of acceleration sensed, or detected, by the accelerometer along or about the axis corresponding to the respective output channel.

Figure 6A:
FIG. 6A shows an example of a suitable coordinate system for a helmet-mounted, hands-free signaler of the type disclosed herein.
Figure 6B:
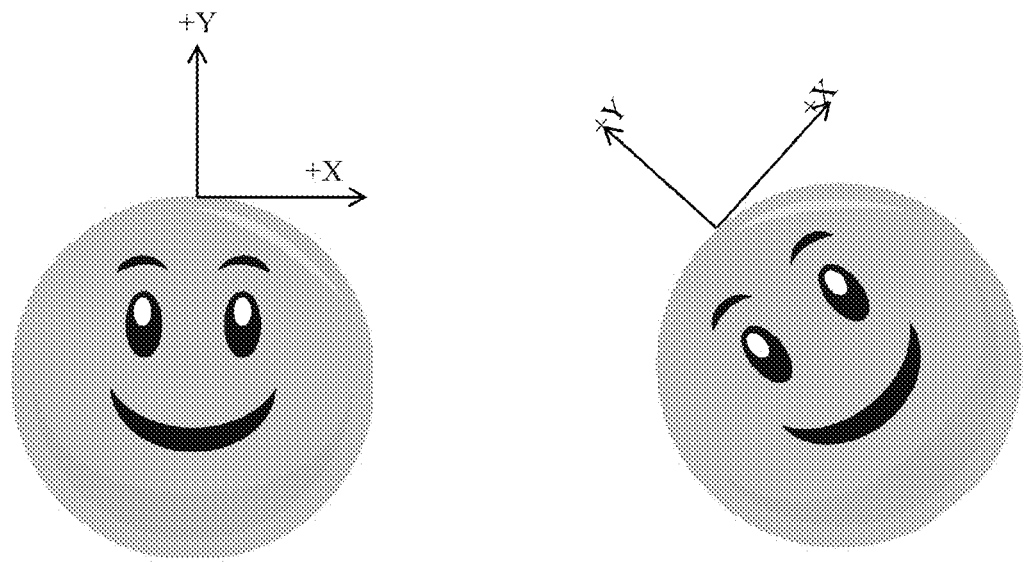
FIG. 6B shows an example of a change in orientation of the coordinate system shown in FIG. 6A corresponding to a change in orientation of a user's head (e.g., as the head tilts)

Although some embodiments of hands-free signaling systems include a three-axis accelerometer, some embodiments, as shown in FIGS. 6A and 6B, can include a two-axis accelerometer. For those embodiments, a suitable two-axis accelerometer is a Model No. ADXL202E accelerometer commercially available from Analog Devices, Inc. The ADXL202E has a measurement range of ±2 g. The ADXL202E can measure dynamic acceleration (e.g., vibration) and static acceleration (e.g., gravity). Each respective output channel corresponding to the coordinate axes can emit a Duty Cycle Modulated (DCM) signal having a duty cycle (e.g., a ratio of pulse width to period) proportional to an observed acceleration along the respective axis. The outputs can be measured directly with a microprocessor counter, requiring no A/D converter or glue logic. The DCM period of the ADXL202E is adjustable from 0.5 ms to 10 ms via a single resistor (RSET). If an analog output is desired, an analog output proportional to acceleration is available from the XFILT and YFILT pins, or may be reconstructed by filtering the duty cycle outputs.

Other sensor types can be used to detect a change in state associated with a user's gesture. As but one example, a tilt-switch mechanism (not shown) can employ a rolling ball in a tube. A center detent can be used as the tilt-sensor in lieu of an accelerometer. In such a sensor embodiment, a user's head-tilt can cause the ball to move from the center detent to one side, actuating an electrical contact positioned adjacent the side. A controller can detect the closed contact and infer a user's intention based on, for example, a duration the contact is closed.

Other sensor types are possible, as well. For example, a spatial recognition sensor can be mounted to a handlebar and can monitor a user's head position, facial expression, or other aspect of a user that can be voluntarily adjusted in correspondence with a user's intention or desire. The Kinect® sensor commercially available from Microsoft® Corporation is but one example of such a sensor suitable for monitoring a user's head position, facial expression, or other aspect of a user that can be voluntarily adjusted in correspondence with a user's intention or desire. The Kinect sensor includes a combination of audio, video, and infrared sensors for performing such monitoring and detecting.

A gesture-detection sensor can detect a particular gesture or combination of gestures (e.g., head movement, facial expression, or combination thereof) indicative of a user's intention and emit one or more control signals corresponding to the detected gesture or combination of gestures. Such a control signal can provide a suitable input to a controller. The controller can, in response to a received input from a gesture detection sensor, activate a visual cue, an audio cue, or a combination thereof, which can communicate the user's intention or circumstances (e.g., the user's intention to turn left or right, to stop, or to seek help or assistance as after a crash) to others.

Controllers and Gesture Recognition

Some controllers are configured to infer a user's intention from one or more output signals of a sensor (e.g., a "gesture-detection sensor" as described above). For example, a controller 2 can comprise a computing environment of the type described more fully below. A non-transient computer readable media can contain instructions that, when executed, cause the computing environment to execute a method for inferring a user's intention from an output signal of a gesture-detection sensor.

Figure 9:
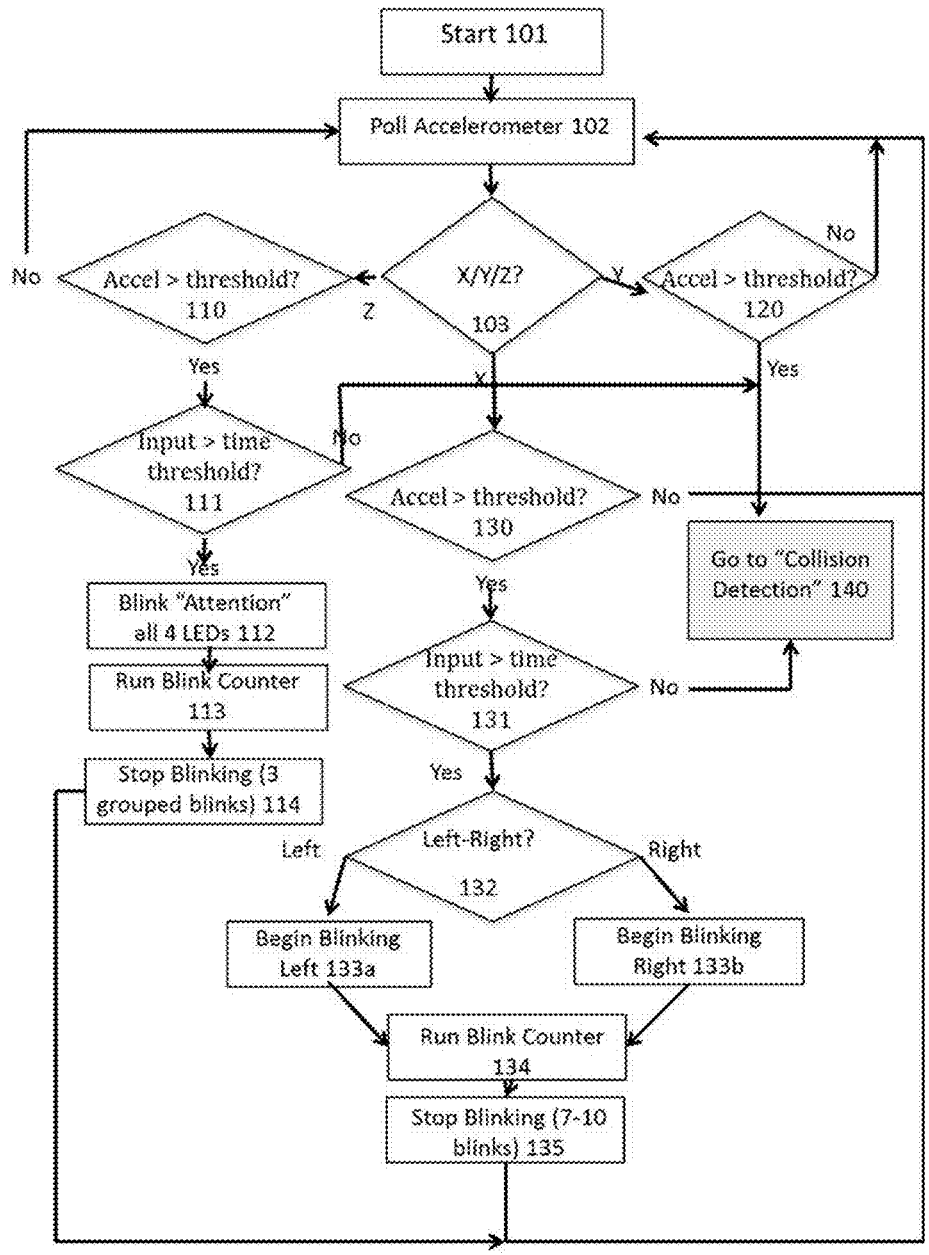
FIGS. 9 through 11 illustrate aspects of methods disclosed herein.
Figure 10:
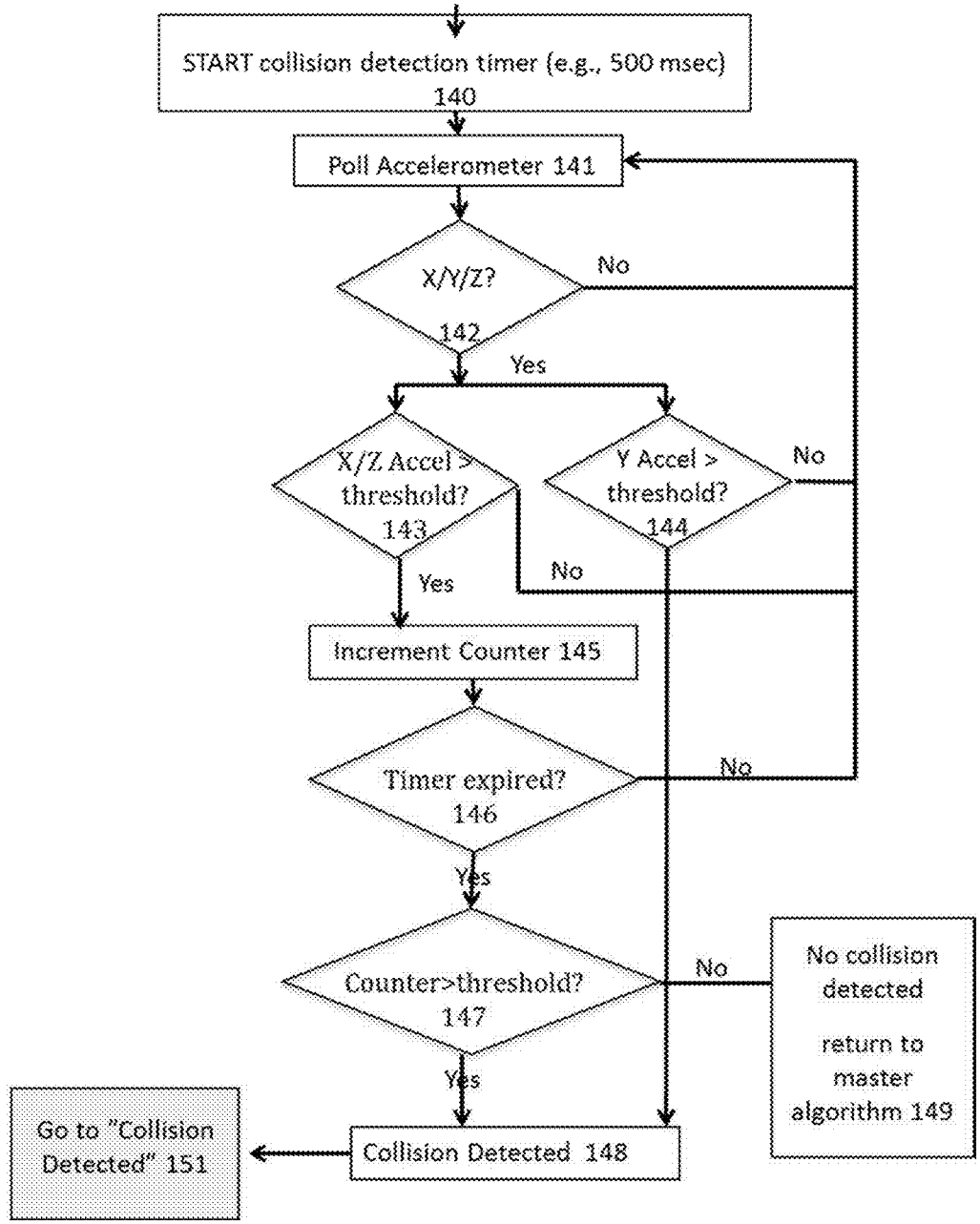
Figure 11:
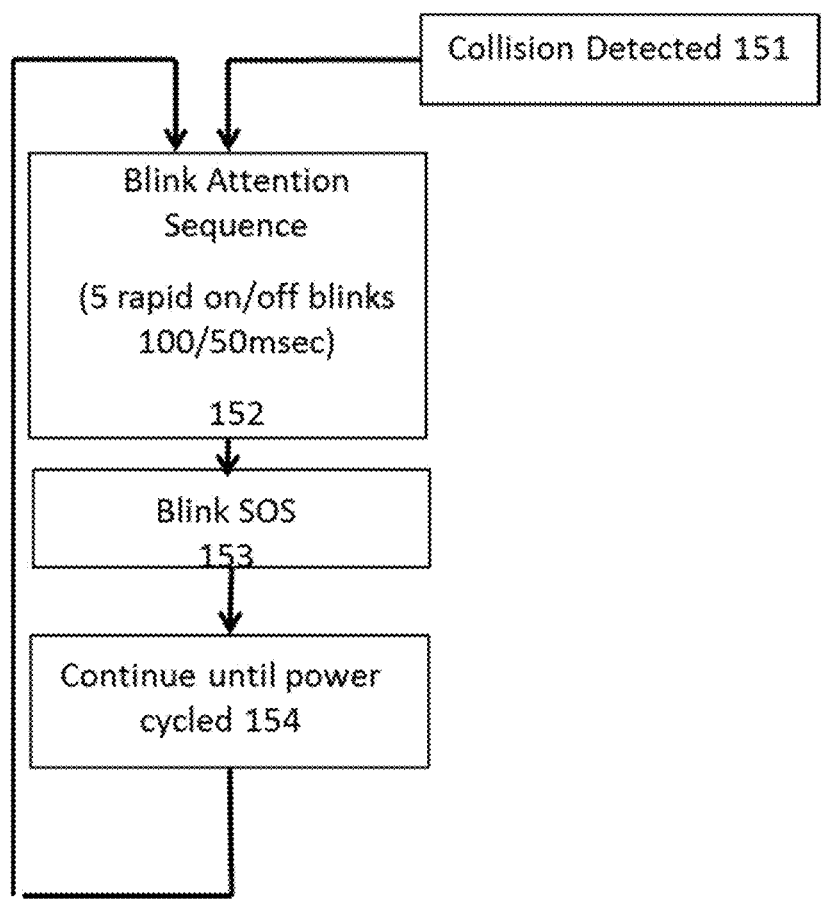
Figure 12:
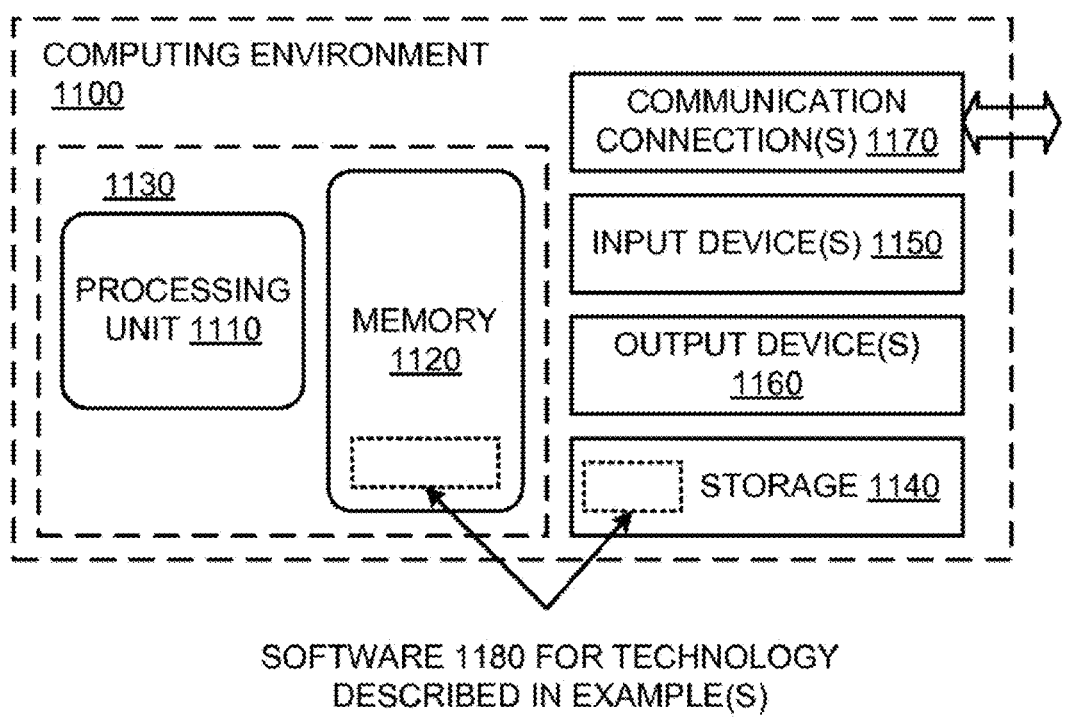
FIG. 12 shows a schematic block diagram of a computing environment of the type disclosed herein.

FIGS. 9, 10, and 11, illustrate aspects of particular examples of methods of interpreting a user's movement to control a signaler of the type disclosed herein. Referring to FIG. 9, a method can start at 101 (e.g., on powering the signaler), and can poll an accelerometer at 102. As but one example of such polling, a controller 2 can observe an input channel to detect the presence of a signal emitted by an accelerometer 9 operatively coupled to the input channel. The controller can detect an amplitude and/or a duty cycle of such a signal in accordance with whether the accelerometer varies a pulse width (or duty cycle) or an amplitude in correspondence with a magnitude of acceleration applied to the accelerometer.

For purposes of methods illustrated in FIGS. 8, 9, and 10, the Z-axis of the accelerometer represents the Cartesian coordinate axis pointing in a direction of a bicycle's travel when a rider is mounted on the bicycle in a neutral position and looking straight ahead. The corresponding Y-axis extends vertically of the rider, and the corresponding X-axis extends transversely relative to the rider. FIG. 6A illustrates such a coordinate system.

Referring again to FIG. 9, disclosed methods can determine along which coordinate axis (or axes) an acceleration has occurred at 103. Gesture-recognition methods can include determining whether an acceleration magnitude along or about one or more selected coordinate axes (e.g., along or about one, two, or three coordinate axes) exceeds a pre-determined threshold acceleration at 110, 120, and/or 130. With a coordinate system as shown in FIG. 6A, the rider can be presumed to have been in an accident at 150 if a Y-component of acceleration exceeds a predetermined threshold magnitude of acceleration along that axis, regardless of the duration of such an acceleration, since a cyclist rarely if ever experiences a substantial vertical acceleration during normal riding conditions.

Figure 6C:
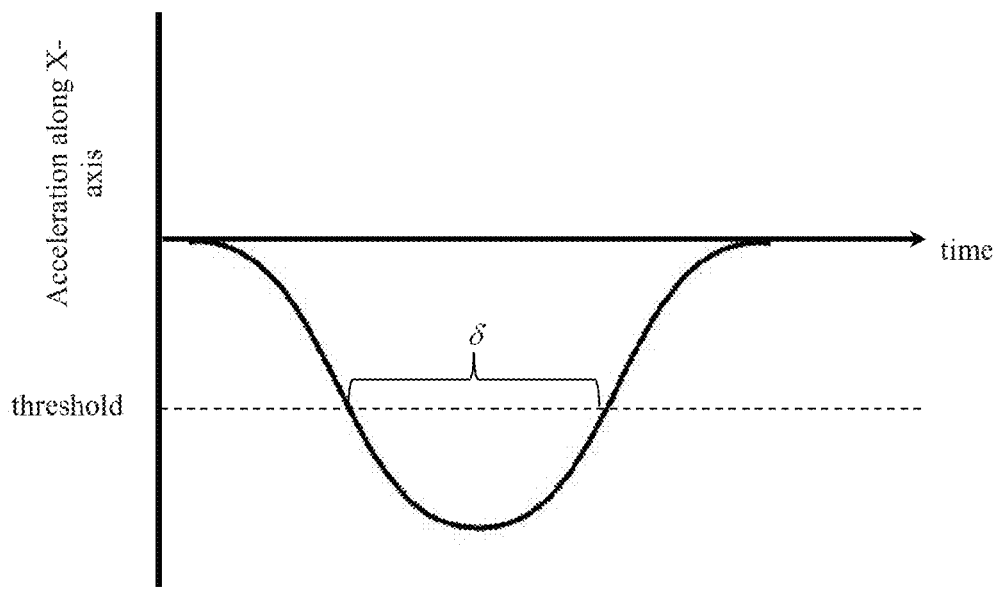
FIG. 6C shows a time-varying acceleration due to gravity along the X-axis shown in FIGS. 6A and 6B as a user's head tilts to the right, as to activate a signaler to indicate the user's intent to turn right.
Figure 7A:
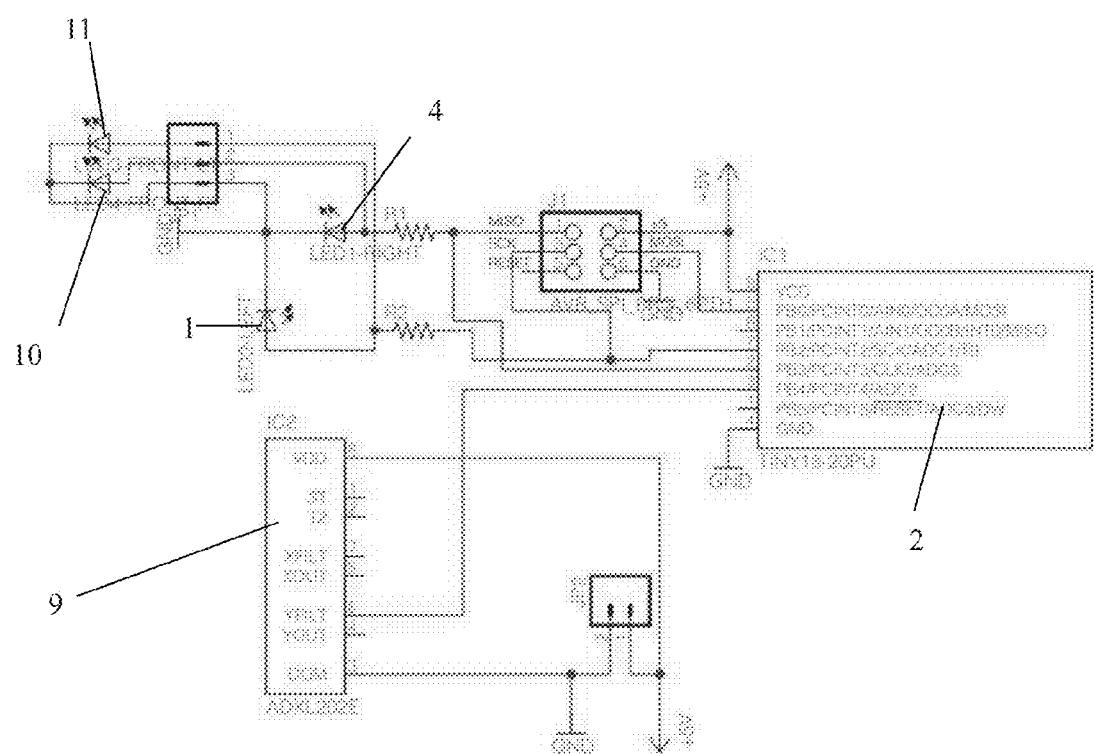
FIG. 7A shows a schematic illustration of the signaler shown in FIGS. 2 through 5.
Figure 7B:
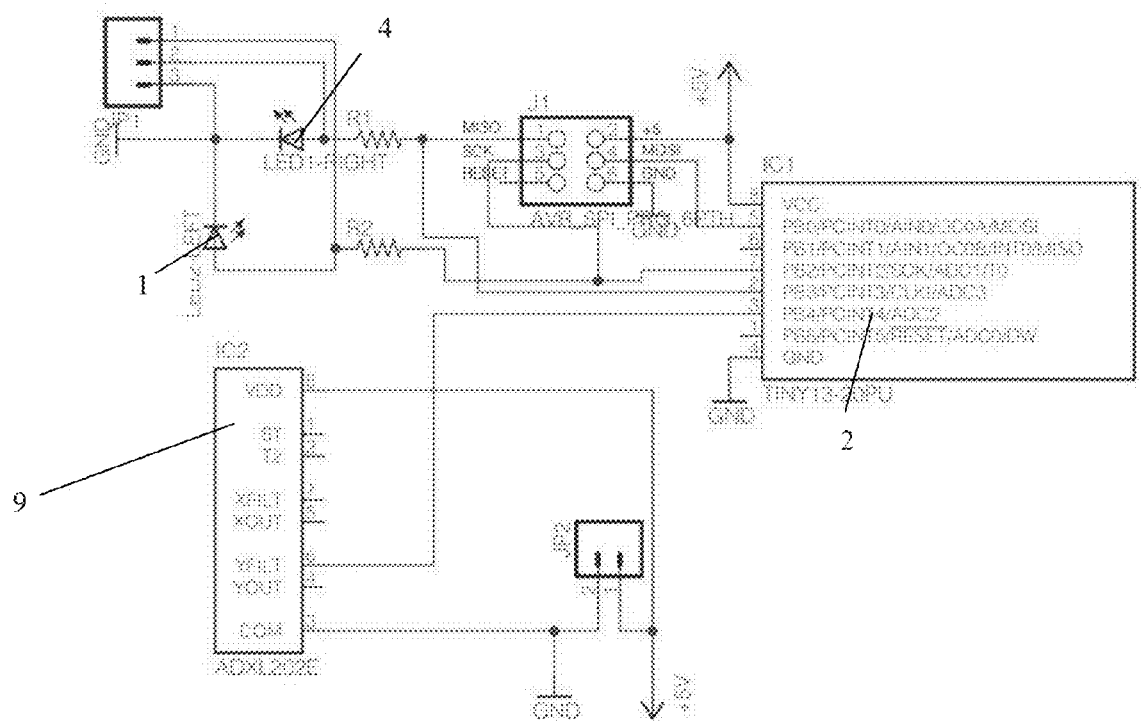
FIG. 7B shows a schematic illustration of a signaler similar to the signaler shown in FIGS. 2 through 5, but omitting user-indicators.

Illustrated methods can assess a magnitude of an impulse along or about the Z- or the X-axis to decide whether such acceleration might have resulted from a user's intentional gesture, as by tilting his head (e.g., shown in FIG. 6B). For example, methods can determine whether an input acceleration along the Z- and/or the X-axes lasts for a duration δ (FIG. 6C) greater than a predetermined duration (or time threshold) at 111 and 131. If not, the method can interpret such an acceleration as possibly resulting from an accident and activate an accident detection method at 150. FIG. 6C shows but one example of a time-varying acceleration that can be detected along the X-axis by the accelerometer 9 as a user tilts his head.

An example of a method for assessing whether to interpret such an acceleration from 111 or 131 as resulting from an accident is shown in FIG. 10. For example, a collision detection timer (e.g., a 500 millisecond (ms) timer) can be started at 140. The accelerometer can be polled at 141 until an acceleration along one or more axes is detected at 142. If a Y-acceleration is detected at 144, a collision is detected at 148 and a collision activation method can be performed, e.g., according to FIG. 11. If an X- or a Z-acceleration is detected at 143, a counter can be incremented at 145. If the collision-detection timer has not yet expired, the accelerometer can be polled again at 141, and the method can continue as just described. If the timer has expired at 146, a count from the counter can be compared to a selected threshold count at 147. If the count of substantial accelerations exceeds the selected threshold count (e.g., about 5, such as between about 3 and about 6) within the collision-detection time, a collision can be recognized at 148. Alternatively, the controller can infer that no collision occurred at 149 and the controller can return to normal operation, as shown in FIG. 9.

As described above and indicated in FIG. 10 at 151, a collision can be recognized using a disclosed method. Referring now to FIG. 11, on recognizing a collision at 151, the controller can cause one or more indicators to operate in an attention-getting manner at 152. For example, left and right indicators can cycle a selected number of times (e.g., about 5 cycles) through a simultaneous illumination lasting for, for example, about 100 milliseconds (ms) and a simultaneous deactivated state lasting for, for example, about 50 ms. The left and right indicators can simultaneously blink through an S.O.S. in Morse code at 153. The sequence of attention-getting operation followed by an S.O.S. in Morse code can be repeated until the controller is powered off at 154.

Referring again to FIG. 9, if the cyclist holds his or her head tilted to one side or the other (e.g., as indicated in FIG. 6B), or forward or backward, for a sufficient duration), the method can proceed to cause a controller 2 to activate an indicator 1, 4 in a pre-determined manner. For example, if the cyclist holds her head tilted to the left for a sufficient duration, a corresponding (e.g., a positive) acceleration along the X-axis can be sensed (e.g., as shown in FIG. 6C), and the controller can activate a left indicator at 133a (e.g., can cause a left light to blink on and off). If the cyclist holds her head tilted to the right for a sufficient duration, a corresponding (e.g., a negative) acceleration along the X-axis can be sensed, and the controller can activate a right indicator at 133b (e.g., can cause a right light to blink on and off). A counter can be activated at 134, during which time the indicator (e.g., a blinking light) can remain activated. After a selected duration (or number of cycles of on-off blinking), the controller can deactivate the respective indicator at 135.

Each threshold acceleration, or other measure, described herein can be user-adjustable or can be set to a fixed value. A user-adjustable value can be selected using known techniques, as in setup software or by way of a user-input device.

Indicators

As shown in, for example, FIG. 2, a hands-free signaler can have a left indicator 1 and a right indicator 4. Each indicator can comprise any suitable illumination device that can be seen by others when illuminated.

A hands-free signaler can have user-indicators 10, 11 configured to allow a user to observe an operational state of the signaler. For example, one or more LEDs can be positioned within a user's field of view. As shown in FIG. 3, each of a left LED 11 and a right LED 10 can be positioned within a user's field of view and can be activated when a corresponding left 1 or right 4 indicator is activated.

In the example shown in FIGS. 2 and 3, four light emitting diodes form each of (1) a left indicator 1; (2) a right indicator 4; (3) a left user-indicator 11; and (4) a right user-indicator 11. Each of the light emitting diodes is operatively coupled to controller 2 configured to recognize a user's hands-free gesture from one or more outputs from, for example, a three-axis accelerometer.

Alternative Embodiments

As but one possible alternative embodiment, a piezoelectric sound transducer or speaker can produce a tone (e.g., a click) instead of front-mounted light-emitting diodes 10 and 11 to signal operation of the signaling light-emitting diodes 1 and 4 to the user.

Another alternative embodiment can use a 3-axis accelerometer to expand the number of available head gestures and corresponding signals emitted by the signaler. For example, in addition to tilting the head left or right (capable of being detected by a single-axis accelerometer), an accelerometer with an additional one or two axes of detection can detect forward tilt and backward tilt of a user's head.

Such a detected movement can be interpreted as any number of user-intended commands by a controller. For example, a controller can interpret a forward or a backward tilt as an indication of a user's desire to control an electronic device (e.g., to answer a cell phone, to skip a song in a music player, to increase or to decrease a volume of a song currently playing, to change a color of a light-emitting diode in a signaler of the type disclosed herein, or any of a variety of other commands for controlling an electronic device).

As yet another alternative, a rapid alternating head tilt in a forward-backward manner and/or in a left-right manner can be interpreted by the microcontroller 2 as a user's intention to emit still other control signals. for example, start and stop of bilateral blinking of the signal indicators (analogous to auto hazard lights) or start and stop of sequential, alternating left-right blinking.

Still another alternative embodiment, a piezoelectric transducer can be activated to sound an audible alarm.

And, in a still further alternative embodiment, rapid, short-duration acceleration or deceleration along one or more axes can be interpreted by the controller as resulting from an unintended event, as in a crash or accidental impact. In response, a controller can emit one or more activation, sensed by accelerometer microchip 9 and conveyed to microcontroller 2, could trigger rapid, sequential or simultaneous blinking of all light-emitting diodes, in order to assist rescuers in locating a potentially injured cyclist following an accident. An additional piezoelectric transducer could be similarly triggered to sound an alarm.

Computing Environments

FIG. 11 illustrates a generalized example of a suitable computing environment 1100 in which described methods, embodiments, techniques, and technologies relating to, for example, inferring whether a change in state detected by a sensor reflects a user's intention to activate a signaler or an unintended movement (e.g., an accident), may be implemented. The computing environment 1100 is not intended to suggest any limitation as to scope of use or functionality of the technology, as the technology may be implemented in diverse general-purpose or special-purpose computing environments. For example, each disclosed technology may be implemented with other computer system configurations, including hand held devices, multiprocessor systems, microprocessor-based or programmable consumer electronics, network PCs, minicomputers, mainframe computers, and the like. Each disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein.

A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other tangible medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal. The data signal can include information pertaining to a physical parameter observed by a sensor or pertaining to a command issued by a controller, e.g., to invoke a change in an operation of a component in the system 20 (FIG. 2).

Tangible computer-readable media are any available, tangible media that can be accessed within a computing environment 1100. By way of example, and not limitation, with the computing environment 1100, computer-readable media include memory 1120, storage 1140, communication media (not shown), and combinations of any of the above. Tangible computer-readable media exclude transitory signals.

Exemplary Listing of Computer-Executable Instructions that, when Executed, Cause a Selected Computing Environment to Carry Out a Method as Disclosed Herein The following listing of computer instructions, or code, is adapted to cause a turn indicator to blink in response to a detected acceleration, as can arise from a user tilting her head when wearing a signaler of the type described herein. Any suitable accelerometer and any suitable controller can be used.

```
/*blink in response to a selected input to a controller (e.g., attiny85) from an
accelerometer (e.g., adxl202E)*/
#define LEFTLOOPCOUNT 55
#define RIGHTLOOPCOUNT 35
#define RIGHT_THRESHOLD 35
#define LEFT_THRESHOLD 65
intval=0;
inti=0;
intleftcount=0;
intrightcount=0;
void setup( ){
    pinMode(2,OUTPUT);
    pinMode(3,OUTPUT);
    blinkok( );
```

-continued

```
}
void loop( ){
    val=analogRead(2);
    if(((val/10)>LEFT_THRESHOLD)&&(leftcount>LEFTLOOPCOUNT))
    {
        for(i=0;i<7;i++){
            digitalWrite(3,HIGH);
            delay(250);
            digitalWrite(3,LOW);
            delay(250);
        }
        leftcount=0;
}
else if((val/10)>LEFT_THRESHOLD) {
    leftcount+=1;
}
if(((val/10)<RIGHT_THRESHOLD)&&(rightcount>RIGHTLOOPCOUNT)){
    for(i=0;i<6;i++){
        digitalWrite(2,HIGH);
        delay(250);
        digitalWrite(2,LOW);
        delay(250);
    }
    rightcount=0;
    }
    else if((val/10)<RIGHT_THRESHOLD) {
        rightcount+=1;
    }
}
voidblinkok( ){
    for(i=0;i<7;i++){
        digitalWrite(2,HIGH);
        delay(100);
        digitalWrite(2,LOW);
        digitalWrite(3,HIGH);
        delay(100);
        digitalWrite(3,LOW);
    }
}
```

Other Embodiments

The examples described above generally concern hands-free signaling techniques and related systems. Other embodiments than those described above in detail are contemplated based on the principles disclosed herein, together with any attendant changes in configurations of the respective apparatus described herein. Incorporating the principles disclosed herein, it is possible to provide a wide variety of systems adapted to cancel echo from a signal, for example, in "hands-free" automobile communication systems, in aviation communication systems, in conference room speaker phones, in auditorium sound systems, etc.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of filtering and computational techniques can be devised using the various concepts described herein. Moreover, those of ordinary skill in the art will appreciate that the exemplary embodiments disclosed herein can be adapted to various configurations and/or uses without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly What is currently claimed:

1. A hands-free signaler, comprising:
   an accelerometer configured to detect a magnitude of acceleration along an axis generally parallel to an axis extending vertically from a user's head;
   a controller configured to assess whether an acceleration along the axis generally parallel to the axis extending vertically from the user's head is greater than a predetermined threshold; and
   an illuminable indicator, wherein the controller is further configured to selectively activate the illuminable indicator in a manner indicative of an emergency responsive to the acceleration being greater than the predetermined threshold.

2. A hands-free signaler according to claim 1, wherein the manner corresponding to the detected acceleration comprises a first manner, wherein the controller is further configured to selectively activate the illuminable indicator in a second manner.

3. A hands-free signaler according to claim 1, further comprising:
   a printed circuit board defining a plurality of electrical couplers extending among and operatively coupling the accelerometer, the controller, and the illuminable indicator to each other; and
   a housing substantially surrounding the printed circuit board, the accelerometer, the controller, and the illuminable indicator.

4. A hands-free signaler according to claim 3, wherein the housing comprises a lens overlying the illuminable indicator so as to permit light emitted by the illuminable indicator to pass outwardly of the housing.

5. A hands-free signaler according to claim 3, wherein the housing is configured to be fixedly attached to an article of clothing or an article of headwear.

6. A hands-free signaler according to claim 3, wherein the accelerometer is positioned generally centrally relative to the printed circuit board.

7. A hands-free signaler according to claim 1, wherein the illuminable indicator comprises a first illuminable indicator, the hands-free signaler further comprising a second illuminable indicator.

8. A hands-free signaler according to claim 3, wherein the illuminable indicator comprises a first illuminable indicator, the hands-free signaler further comprising a second illuminable indicator, wherein the accelerometer is positioned between the first illuminable indicator and the second illuminable indicator.

9. A hands-free signaler according to claim 1, wherein the accelerometer comprises a first accelerometer and the hands-free signaler further comprises a second accelerometer configured to detect an acceleration along an axis other than the axis generally parallel to the axis extending vertically from the user's head.

10. A hands-free signaler according to claim 1, wherein the accelerometer is further configured to detect an acceleration along an axis other than the axis generally parallel to the axis extending vertically from the user's head.

11. A hands-free signaler according to claim 1, wherein is configured to assess whether a detected acceleration corresponds to a tilted head of the user.

12. A hands-free signaler according to claim 1, further comprising:
    a printed circuit board defining a plurality of electrical couplers extending among and operatively coupling the accelerometer, the controller, and the illuminable indicator to each other; and
    an article of headwear housing the printed circuit board, the accelerometer, the controller, and the illuminable indicator.

13. A tangible, non-transitory computer readable medium containing computer implementable instructions that, when executed, cause a computing environment to perform a method comprising:
    observing a signal from a gesture-detection sensor indicative of a user's movement;
    determining whether a first measure of the user's movement exceeds a first predefined threshold measure of user movement and determining whether a duration of the user's movement exceeds a predefined threshold duration of user movement;
    activating an illuminable indicator if the first measure of the user's movement exceeds the first predefined threshold measure and if the duration of the user's movement exceeds the predefined threshold duration; and
    assessing a magnitude of acceleration along an axis generally parallel to an axis extending vertically from the user's head; and
    responsive to an acceleration along the axis generally parallel to the axis extending vertically from the user's head greater than a predetermined threshold, periodically illuminating the illuminable indicator in a selected manner indicative of an emergency.

14. The computer readable medium according to claim 13, wherein the method further comprises assessing whether the user's movement resulted from an accident, and activating the illuminable indicator in an emergency pattern if the user's movement is assessed to have resulted from an accident.

15. The computer readable medium according to claim 13, wherein the gesture-detection sensor comprises an accelerometer and wherein the first measure of the user's movement comprises an acceleration along an axis extending generally parallel to an axis extending between the user's ears.

* * * * *